United States Patent [19]

Bender

[11] Patent Number: 4,803,128
[45] Date of Patent: Feb. 7, 1989

[54] LATTICE

[75] Inventor: Ulrich Bender, Siegen, Fed. Rep. of Germany

[73] Assignee: Firma Emil Bender, Siegen, Fed. Rep. of Germany

[21] Appl. No.: 86,704

[22] Filed: Aug. 18, 1987

[30] Foreign Application Priority Data

Aug. 29, 1986 [DE] Fed. Rep. of Germany ....... 3629527

[51] Int. Cl.$^4$ .............................................. B21D 31/04
[52] U.S. Cl. .................................... 428/577; 428/596; 428/135
[58] Field of Search ............... 428/596, 135, 613, 577, 428/573; 52/670; 29/6.1, 6.2

[56] References Cited

U.S. PATENT DOCUMENTS

| 948,414 | 2/1910 | Clark | 52/670 |
|---|---|---|---|
| 979,130 | 12/1910 | Clark | 29/6.1 |
| 1,104,476 | 7/1914 | Clark | 29/6.1 |
| 1,314,107 | 8/1919 | Waller | 52/670 |
| 1,862,221 | 6/1932 | Kaminetsky | 29/6.1 |
| 3,947,936 | 4/1976 | Wheedon | 29/6.1 |
| 4,099,309 | 7/1978 | Bender | 29/6.1 |

FOREIGN PATENT DOCUMENTS

| 309100 | 11/1918 | Fed. Rep. of Germany . |
|---|---|---|
| 1773197 | 8/1958 | Fed. Rep. of Germany . |
| 2700603 | 5/1980 | Fed. Rep. of Germany . |
| 460363 | 1/1937 | United Kingdom . |
| 688693 | 3/1953 | United Kingdom . |
| 1367984 | 9/1974 | United Kingdom . |
| 1442936 | 7/1976 | United Kingdom . |
| 1540317 | 2/1979 | United Kingdom . |
| 2084915A | 4/1982 | United Kingdom . |

Primary Examiner—John J. Zimmerman
Attorney, Agent, or Firm—Toren, McGeady & Associates

[57] ABSTRACT

A lattice of metal or plastics material obtained by stretching a blank or strip which has been provided with rows of slits. The lattice has rhomboid or rhomboidal openings which are bordered by webs which extend obliquely relative to the plane of the lattice. The major diagonals of the openings include an acute angle with the edge of the lattice. The major diagonals of the openings have such an angular position that two webs which extend parallel to one another also extend parallel to the edge of the lattice. The webs located in the same row which define openings arranged one behind the other in the direction of the lattice edge are arranged so as to follow each other immediately and at least approximately in a straight line.

7 Claims, 3 Drawing Sheets

LATTICE

BACKGROUND OF THE INVENTION

1. Field of the Invention

The present invention relates to a lattice, preferably a metal lattice, which is obtained by stretching a blank or strip, preferably a sheet metal blank or sheet metal strip, which has been provided with rows of slits. The lattice has rhomboid or rhomboidal openings which are bordered by webs which extend obliquely relative to the plane of the lattice. The longer or major diagonals of the openings include an acute angle with the edge or border of the lattice.

2. Description of the Prior Art

Lattices of the above-described type are already known from German Utility Model No. 1,773,197. Compared to other known lattices in which the longer diagonals of the rhomboid or rhomboidal openings extend parallel to the edge of the lattice, the lattices of the type disclosed in German Utility Model No. 1,773,197 have the advantage that they have approximately the same bending strength in longitudinal direction and in transverse direction. Therefore, in practical use, these lattices are structurally relatively stable.

However, the lattices of the type disclosed in German Utility Model No. 1,773,197 as well as the other known lattices have in common a deficiency which is due to the fact that all edges or borders of the lattices are wave-shaped or are interrupted at a plurality of locations, because the webs which border the openings include over the major portion of their lengths an acute angle with the edges of the lattices.

The interrupted or wave-like shape of all edges of the known lattices reduces the usefulness of these lattices. The relatively sharp edges at the borders of the lattices mean that there is a danger of injury to the person handling the lattices. In addition, in certain types of applications of the lattices, it is unavoidable that at least some of the edges or borders of the lattices must subsequently be equipped with rectilinear border strips.

These border strips are particularly required if the lattices are to be used as so-called accumulator lattices.

It is, therefore, the primary object of the present invention to provide a lattice of the above-described type which, after the stretching procedure has been carried out, is not wave-shaped or toothed at at least two parallel edges of the lattice.

SUMMARY OF THE INVENTION

In accordance with the present invention, this object is met by a lattice in which the longer diagonals of the openings have such an angular position that two webs which extend parallel to one another also extend parallel to the edge of the lattice. In addition, the webs located in the same row which define openings arranged one behind the other in the direction of the lattice edge are arranged so as to follow each other immediately and at least approximately in a straight line.

The lattice according to the invention may be of metal or plastics material. In accordance with an important further development of the invention, the blank for forming the lattice may have the shape of a parallelogram or rhomboid and the rows of slits made in this blank extend parallel to those edges of the blank which extend at least approximately transversely or at an acute angle relative to the stretching direction.

After the blank having a parallelogram or rhomboid shape has been stretched into an approximately rectangular shape, the configuration of the lattice according to the invention described above is obtained automatically.

In accordance with another feature of the present invention, the webs extending parallel to the lattice edge have at least in the vicinity of the edge a greater width than the webs extending at an acute angle to the lattice edge. As a result, the inherent stability of the lattice according to the invention is improved.

In accordance with a particularly important feature of the present invention, the lattice is used as a battery plate lattice or accumulator lattice and is made of an appropriate metal alloy or a material having a suitable metal coating. This feature is important because, in such accumulator lattices, the webs extending rectilinearly along at least one metal lattice edge result in a highly desirable minimization of the electrical resistance.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figures 1A, 1B:
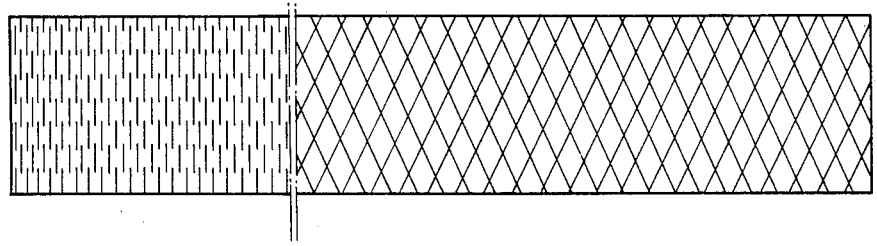
FIGS. 1a to 1c and FIGS. 2a to 2c depict prior art lattices.

As illustrated in FIG. 1a of the drawing, a rectangular sheet metal strip is provided in its transverse direction with a plurality of rows of slits. The slits are placed in such a way that rows of slits which are arranged immediately adjacent each other are offset in longitudinal direction in a certain manner.

A lattice is obtained by stretching or pulling apart the blank in its longitudinal direction, as illustrated in FIG. 1b. The resulting rhomboid or at least rhomboidal openings are bordered by webs located adjacent the slits prior to stretching the blank. These webs assume an essentially wave-shaped configuration and, simultaneously, the webs are raised so as to include an acute angle with the principal plane of the lattice.

The dimension of a lattice, particularly of a metal lattice, in stretching direction is substantially greater than the corresponding dimension of the blank used as initial material. As a rule, the stretching is carried out in such a way that the dimension is doubled in stretching direction. However, it is also possible to carry out the stretching in such a way that the corresponding dimension of the lattice is at least approximately tripled as compared to the blank used as initial material.

Figure 1C:
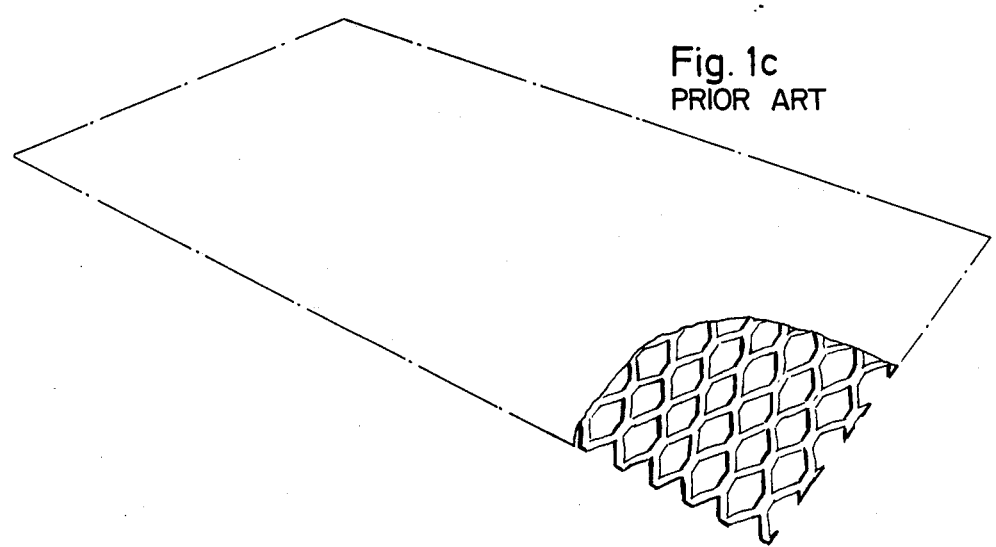

In each case, the long or major diagonal of the openings formed between the webs extends tranversely of the stretching direction, i.e., in the case of FIGS. 1b and 1c, transversely of the longitudinal direction of the lattice.

Figures 2A, 2B:
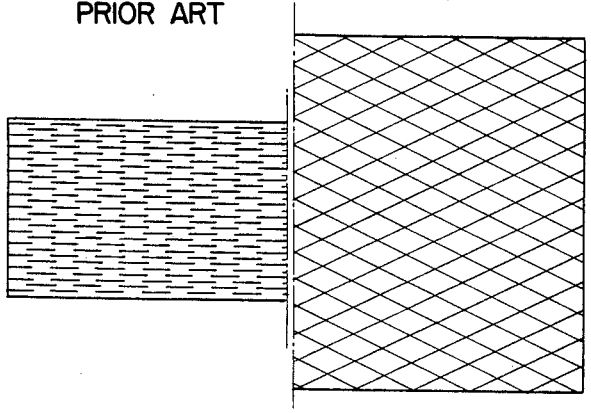

As illustrated in FIG. 2a of the drawing, a rectangular blank is provided with rows of slits which extend parallel to the longitudinal direction of the blank. Accordingly, in this case, the stretching of the blank to obtain a lattice is carried out transversely of the longitudinal direction of the blank.

In the resulting rhomboid or rhomboidal openings which are bordered by the webs, the long or major diagonal of each opening extends transversely of the stretching direction of the lattice.

Figure 2C:
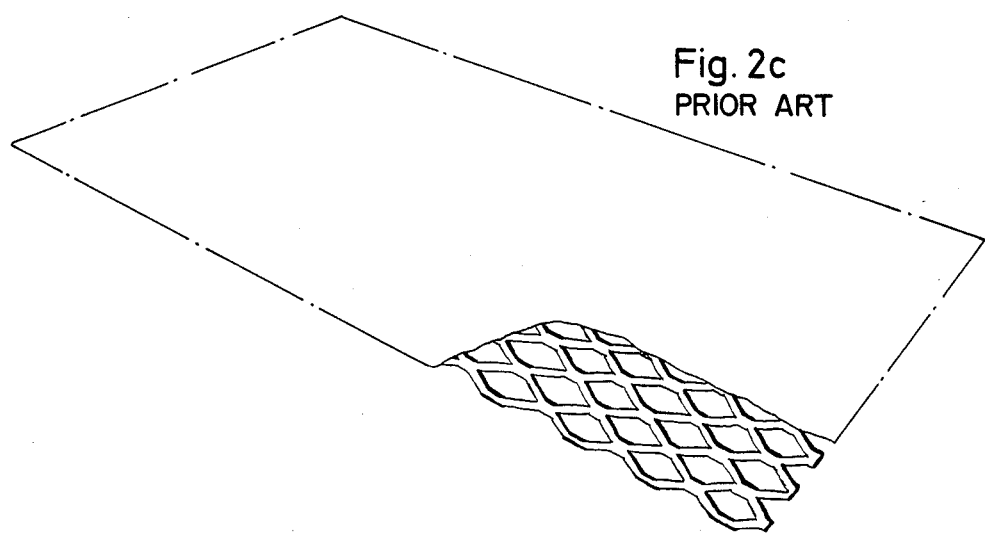

The lattice which has been stretched in longitudinal direction in accordance with FIGS. 1a to 1c has its highest bending strength in the transverse direction thereof; the lattice stretched in transverse direction in accordance with FIGS. 2a to 2c has its highest bending strength in the longitudinal direction thereof.

Figure 3A:
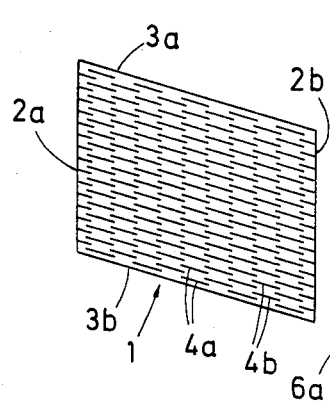
FIG. 3a is a plan view of a blank used for making the lattice according to the present invention.

FIG. 3a of the drawing shows a blank 1 which has a circumferential outline in the shape of a parallelogram or rhomboid. In other words, the two transverse edges 2a and 2b and the two longitudinal edges 3a and 3b, respectively, extend parallel to each other.

As further illustrated in FIG. 3a, blank 1 has parallel rows of slits 4a and 4b cut essentially uniformly over the entire surface of the blank. The slits are cut by means of appropriately toothed knives. The rows of slits 4a and 4b extend parallel to the longitudinal edges 3a and 3b of blank 1.

The slits in rows of slits 4a and 4b arranged adjacent each other are offset relative to each other in longitudinal direction in such a way that only their end portions overlap, while the middle portions thereof are located between the ends of two slits in the adjacent row of slits.

After the blank 1 has been provided essentially over its entire surface with uniformly distributed rows of slits 4a and 4b, blank 1 is stretched by means of a special tool essentially parallel to its two transverse edges 2a and 2b in such a way that the lattice 5 illustrated in FIG. 3 is obtained. Lattice 5 obtained by stretching blank 1 has now an essentially rectanular circumferential outline with two transverse edges 6a and 6b which extend parallel to each other and two longitudinal edges 7a and 7b which also extend parallel to each other.

The openings 8 obtained in the lattice by the stretching procedure have a rhomboid or at least rhomboidal circumferential outline. The openings 8 are bordered by webs 9a which extend parallel to each other and, on the other hand, by webs 9b which also extend parallel to each other. While webs 9a also extend parallel to longitudinal edges 7a and 7b of the lattice 5, webs 9b extend so as to include an acute angle with webs 9a. Furthermore, webs 9b include acute angles with the longitudinal edges 7a and 7b of lattice 5 as well as with the transverse edges 6a and 6b of lattice 5.

The long or major diagonals 10 of openings 8 of the lattice 5, in the arrangement of the webs 9a and 9b illustrated in FIG. 3, also extend so as to include an acute angle with the longitudinal edges 7a and 7b of lattice 5.

Figure 3B:
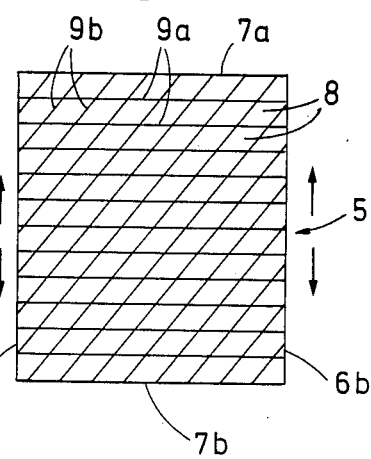
FIG. 3b is a plan view of the blank of FIG. 3a stretched into rectangular shape.
Figure 3C:
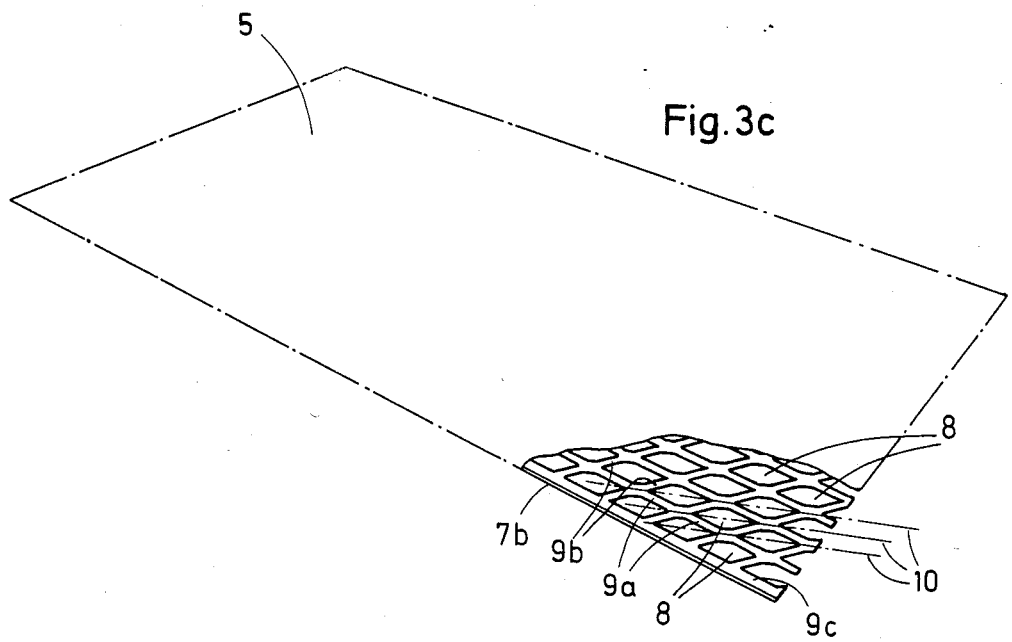
FIG. 3c is a perspective view of the lattice according to the present invention.

In the lattice 5 according to FIGS. 3b and 3c obtained by stretching from blank 1 of FIG. 3a, it has been found of particular importance that, of the webs 9a extending at least approximately parallel to the longitudinal edges 7a and 7b of the lattice 5, at least those webs 9c located immediately adjacent the longitudinal edges 7a and 7b are arranged one immediately behind the other and at least approximately along a straight line, as clearly illustrated in FIG. 3c. Moreover, it has been found particularly useful if the webs 9c forming the longitudinal edge portions of the lattice 5 have a greater width than the webs 9b extending at an angle relative to the webs 9c.

However, the webs 9a located remote from the longitudinal edges 7a and 7b may also have a greater width than the webs 9b extending at an angle relative to the webs 9a. In most cases, it is sufficient if the webs 9c forming the longitudinal edges 7a and 7b have a width which corresponds approximately to twice or three times the width of webs 9b.

If blank 1 used for manufacturing the lattices is of a material composed of a suitable alloy, the rectangular lattice 5 shown in FIGS. 3b and 3c obtained by stretching the parallelogram-shaped or rhomboid-shaped blank 1 shown in FIG. 3a, can be particularly advantageously used as a so-called battery plate lattice. In this case, the webs 9c located at the longitudinal edges 7a nd 7b of the metal lattice 5 not only serve to increase the stiffness of the lattice, but they also result in a particularly advantageous minimization of the electrical resistance of the battery plate lattice or accumulator lattice.

While specific embodiments of the invention have been shown and described in detail to illustrate the application of the inventive principles, it will be understood that the invention may be embodied otherwise without departing from such principles.

I claim:

1. A lattice obtained by stretching a blank having a plurality of rows of slits, the lattice defining an edge and having webs which define rhomboid or rhomboidal openings, the webs extending obliquely relatively to the plane of the lattice, the major diagonal of the openings including an acute angle with the edge of the lattice, the major diagonals of the openings having such an angular position that always two webs which extend parallel to one another also extend parallel to the edge of the lattice, the webs located in the same row defining openings arranged one behind the other in the direction of the lattice edge being arranged so as to follow each other immediately and at least approximately in a straight line; wherein the blank has parallelogram or rhomboid shape, and wherein the rows of slits extend parallel to the edges of the lattice which extend at least approximately transversely or at an acute angle to the stretching direction of the blank.

2. The lattice according to claim 1, wherein the blank is of metal.

3. The lattice according to claim 1, wherein the blank is of plastics material.

4. The lattice according to claim 1, wherein the blank is stretched into a rectangular shape.

5. The lattice according to claim 1, wherein the lattice includes webs extending parallel to the lattice edge, the webs extending parallel to the lattice edge having a greater width than the webs which extend at an acute angle to the lattice edge.

6. The lattice according to claim 1, wherein the lattice is of a metal alloy.

7. The lattice according to claim 1, wherein the lattice is coated with a metal coating.

* * * * *